United States Patent Office 3,845,207
Patented Oct. 29, 1974

3,845,207
COMBATTING PESTS WITH O-PYRAZOLO-PYRIMIDINE-(THIONO) - PHOSPHORIC (PHOSPHONIC) ACID ESTERS
Hellmut Hoffmann, Wuppertal-Elberfeld, Ingeborg Hammann and Wolfgang Behrenz, Cologne, Bernhard Homeyer, Opladen, and Wilhelm Stendel, Wuppertal-Elberfeld, Germany, assignors to Bayer Aktiengesellschaft, Leverkusen, Germany
No Drawing. Original application June 29, 1971, Ser. No. 158,046, now Patent No. 3,761,479. Divided and this application Mar. 29, 1973, Ser. No. 346,219
Claims priority, application Germany, July 8, 1970, P 20 33 947.3
Int. Cl. A01n 9/36
U.S. Cl. 424—200                 10 Claims

ABSTRACT OF THE DISCLOSURE

O-pyrazolo-pyrimidine-(thiono)-phosphoric (phosphonic) acid esters of the general formula

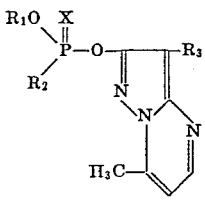

(I)

in which $R_1$ is an alkyl radical with 1 to 6 carbon atoms,
$R_2$ is an alkyl radical with 1 to 4 carbon atoms or an alkoxy radical with 1 to 6 carbon atoms,
$R_3$ is hydrogen, chlorine or bromine, and
X is oxygen or sulfur, which possess insecticidal, acaricidal, nematocidal, fungicidal and molluscicidal properties.

This is a division, of application Ser. No. 158,046 filed June 29, 1971, now U.S. Pat. No. 3,761,479.

The present invention relates to and has for its object the provision of new O-pyrazolo-pyrimidine-(thiono)-phosphoric (phosphonic) acid esters, i.e. 2-hydroxy-3-optionally chloro- or bromo-substituted-7-methyl-pyrazolo-(1,5-α) pyrimidine esters of (thiono)-phosphoric (alkane-phosphonic) acid esters, which possess insecticidal, acaricidal, nematocidal, fungicidal and molluscicidal properties, active compositions in the form of mixtures of such compounds with solid and liquid dispersible carrier vehicles, and methods for producing such compounds and for using such compounds in a new way especially for combating pests, e.g. insects, acarids, nematodes, fungi and molluscs, especially insects, acarids and nematodes, with other and further objects becoming apparent from a study of the within specification and accompanying examples.

It is known from Belgian Patent Specification 676,802 and published Dutch Patent Application 65/16,907 that O-pyrazolopyrimidine - (thiono)-phosphoric(phosphonic, phosphinic) acid ester derivatives, for example O,O-diethyl-O-[5,7 - dimethylpyrazolo(1,5-α)-pyrimidine-(2)yl]-phosphoric acid ester, exhibit pesticidal activity, particularly insecticidal and acaricidal activity.

The present invention provides O-pyrazolopyrimidine-(thiono)-phosphoric(phosphonic) acid esters of the general formula:

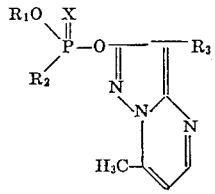

(I)

in which $R_1$ is an alkyl radical with 1 to 6 carbon atoms,
$R_2$ is an alkyl radical with 1 to 4 carbon atoms or an alkoxy radical with 1 to 6 carbon atoms,
$R_3$ is hydrogen, chlorine or bromine, and
X is oxygen or sulfur.

These compounds have been found to possess strong insecticidal, acaricidal (including tickicidal) and nematocidal properties.

The invention also provides a process for the production of an O-pyrazolo-pyrimidine-(thiono)-phosphoric (phosphonic) acid ester derivative of formula (I) in which a (thiono)phosphoric(phosphonic) acid ester halide of the general formula:

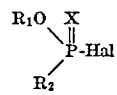

(II)

in which $R_1$, $R_2$ and X have the meanings stated above, and
Hal is halogen, preferably chlorine, is reacted with a 2-hydroxypyrazolopyrimidine derivative of the general formula:

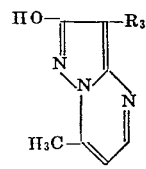

(III)

in which $R_3$ has the meaning stated above, in the presence of an acid acceptor or in the form of an alkali metal salt, alkaline earth metal salt or ammonium salt.

Surprisingly, the O-pyrazolopyrimidine-(thiono)-phosphoric(phosphonic) acid esters according to the invention show a considerably higher insecticidal and acaricidal activity than the known O-pyrazolopyrimidine(thiono) phosphoric(phosphonic, phosphinic) acid esters which are chemically the most closely comparable substances of the same type of activity. The substances according to the invention therefore represent a genuine enrichment of the art.

If O-ethylethanephosphonic acid ester chloride and 2-hydroxy-7-methyl-pyrazolo(1,5-α)-pyrimidine are used as starting materials, the reaction course can be represented by the following formula scheme:

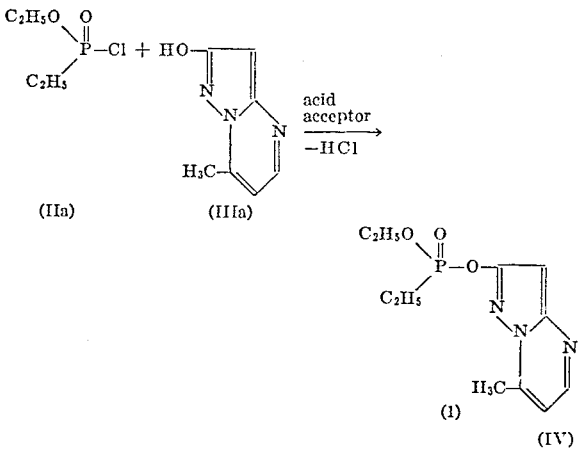

Preferably, $R_1$ is a straight or branched alkyl radical of 1 to 4 carbon atoms, and may for example be a methyl, ethyl, n- or iso-propyl, or n-, sec.-, tert.- or iso-butyl radical; and $R_2$ is a methyl, ethyl, methoxy, ethoxy, n- or iso-propyl, or n-butoxy, sec.-butoxy or tert.-butoxy radical.

As examples of (thiono)phosphoric(phosphonic) acid ester halides of formula (II) which can be used in the process, there are mentioned in particular: O,O-dimethyl-, O,O-diethyl-, O,O-dipropyl-, O,O-di-iso-propyl-, O,O-dibutyl-, O,O-di-tert.-butyl-, O-methyl-O-ethyl-, O-methyl-O-iso-propyl-, O-methyl-O-butyl-, O-ethyl-O-iso-propyl-, O-ethyl-O-butylphosphoric acid ester chlorides or bromides and their thiono analogues; and O-methyl-methane-, O-methyl-ethane-, O-ethyl-methane-, O-propylmethane-, O - propyl-ethane, O - iso-propyl-methane-, O-iso-propylethane-, O-butyl-methane-, O-butyl-ethane-, O-tert.-butyl-methanephosphonic acid ester chlorides or bromides and their thiono analogues.

The (thiono)phosphoric(phosphonic) acid ester halides to be used as starting materials are known and can be prepared according to customary processes. The 2-hydroxypyrazolopyrimidines of the formula (III) may be obtained from 3-aminopyrazolone and acetoacetaldehyde-dimethylacetal and, if appropriate, halogenation in 3-position.

The reaction of the invention is preferably carried out in the presence of a solvent, which term includes a mere diluent. As such, practically all inert organic solvents are suitable. These include especially aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, such as acetone, methylethyl ketone, methylisopropyl ketone and methylisobutyl ketone; and in particular nitriles, such as acetonitrile.

As acid acceptors, all customary acid-binding agents can be used. Particulary good results have been obtained with alkali metal carbonates and alcoholates, such as sodium or potassium carbonate, methylate or ethylate; aliphatic, aromatic or heterocyclic amines, for example triethylamine, dimethylamine, dimethylaniline, dimethylbenzylamine and pyridine.

The reaction temperature can be varied within a fairly wide range. In general the reaction is carried out at about 0 to 100° C., preferably at about 15 to 35° C.

The reaction is, in general, carried out at normal pressure.

In carrying out of the process, the starting materials are generally used in equimolar proportions. An excess of one or the other of the reaction components seems to bring no substantial advantages. The reaction is preferably carried out in the presence of one of the above-mentioned solvents, and in the presence of an acid acceptor, at the temperatures stated; after several hours' stirring, the reaction mixture is worked up as usual.

The substances according to the invention are obtained in most cases in the form of colorless to slightly yellow-colored viscous, water-insoluble oils which cannot be distilled without decomposition but which can, by so-called "slight distillation"' (that is, by longer heating to moderately elevated temperatures under reduced pressure), be freed from the last volatile components and in this way be purified. The refractive index is particularly useful for their characterization. Those compounds which are crystalline may be characterized by their melting point.

As already mentioned, the new O-pyrazolopyrimidine-(thiono)-phosphoric(phosphonic) acid esters are distinguished by an outstanding insecticidal and acaricidal effectiveness against plant pests, hygiene pests and pests of stored products and animal parasites. They possess a good activity against both sucking and biting insects, including blowflies, and mites (*acarina*), including parasitic ticks. At the same time they exhibit a low phytotoxicity. In addition, some of the compounds have also a fungicidal, molluscicidal and nematocidal activity.

For these reasons, the products according to the invention may be used with success as pesticides in crop protection and the protection of stored products as well as in the hygiene field.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Laphygma frugiperda*) and coton worm (*Prodenia cochleariae*), the blossom beetle (*Meligethes aeneus*), *mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*, the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*)

and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), Oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acaria*) contemplated herein there are classed, in particular, the spider mites (*Tetranychidae*) such as the two-spotted spider mite (*Tetranychus telarius = Tetranychus althaeae* or *Tetranychus urticae*) and the European red mite (*Paratetranychus pilosus = Panonychus ulmi*), gall mites, for example the black currant gall mite (*Eriophyes ribis*) and tarsonemids, for example, the broad mite (*Hemitarsonemus latus*) and the cyclamen mite (*Tarsonemus pallidus*); finally, ticks, such as the relapsing fever tick (*Ornithoderus moubata*); and the like.

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially with other known compatible active agents, such as other acaricides, insecticides, fungicides, bactericides and nematodices, or rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, nematodes, fungi and molluscs and more particularly methods of combating at least one of insects, acarids and nematodes, which comprises applying to at least one of correspondingly (a) such insects, (b) such acarids, (c) such nematodes, (d) such fungi, (e) such molluscs, and (f) the corresponding habitat thereof, i.e. the locus to be protected, e.g. to a growing crop, to an area where a crop is to be grown or to a domestic animal, a correspondingly combative or toxic amount, i.e. an insecticidally, acaricidally, nematocidally, fungicidally or molluscicidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

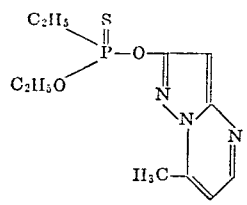

(1)

To 15 g. of 2-hydroxy-7-methyl-pyrazolo(1,5-α)pyrimidine dissolved or suspended in 100 ml. of dimethyl formamide there are added 11 g. of triethylamine and 18 g. of O-ethylethanethionophosphonic acid ester chloride. After 3 hours of stirring, the mixture is poured into water, taken up with methylene chloride, washed, dried and "slight distilled." The yield is 22 g. (77% of theory), the refractive index is $n_D^{23} = 1.5670$.

Calculated for $C_{11}H_{16}O_2N_3SP$ (molecular weight 285): S, 11.2%. Found: S, 11.8%.

EXAMPLES 2–8

In manner analogous to that of Example 1, the following compounds can be prepared:

| Compound | | Physical properties (refractive index or M.P.) |
|---|---|---|
| (2) | $(C_2H_5O)_2-\overset{O}{\underset{\|}{P}}-O-$ [pyrazolopyrimidine-CH_3] | $n_D^{23}=1.5170$. |
| (3) | $(C_2H_5O)_2-\overset{S}{\underset{\|}{P}}-O-$ [pyrazolopyrimidine-CH_3] | $n_D^{23}=1.5515$. |
| (4) | $(CH_3O)_2-\overset{S}{\underset{\|}{P}}-O-$ [pyrazolopyrimidine-CH_3] | M.P., 93° C. |
| (5) | $iC_3H_7O\underset{CH_3}{\overset{S}{\underset{\|}{\diagdown P \diagup}}}-O-$ [pyrazolopyrimidine-CH_3] | M.P., 86–88° C. |

TABLE—Continued

| Compound | | Physical properties (refractive index or M.P.) |
|---|---|---|
| (6) | sec.-$C_4H_9O\underset{CH_3}{\overset{S}{\underset{\|}{\diagdown P \diagup}}}-O-$ [pyrazolopyrimidine-CH_3] | M.P., 44–46° C. |
| (7) | sec.-$C_4H_9O\underset{C_2H_5}{\overset{S}{\underset{\|}{\diagdown P \diagup}}}-O-$ [pyrazolopyrimidine-CH_3] | $n_D^{23}=1.5354$. |
| (8) | $iC_3H_7O\underset{C_2H_5}{\overset{S}{\underset{\|}{\diagdown P \diagup}}}-O-$ [pyrazolopyrimidine-CH_3] | M.P., 60–62° C. |

The starting material for Examples 1–8 can be prepared as follows:

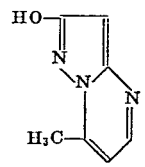

(IIIa)

Into a solution of 40 g. of 3-aminopyrazolone and 108 g. of acetoacetaldehydedimethylacetal in 300 ml. of dry ethanol there is introduced a vigorous stream of hydrogen chloride until the ending of precipitation. The precipitate is then filtered off with suction, triturated with a 2 N solution of sodium hydroxide, again filtered off with suction, and dried.

The yield is 25 g. (42% of theory), the melting point 209° C.

Calculated for $C_7H_7ON_3$ (molecular weight 149): N, 28.2%. Found: N, 28.1%.

EXAMPLE 9

$(C_2H_5O)_2-\overset{S}{\underset{\|}{P}}-O-$ [3-Cl-pyrazolopyrimidine-CH_3]

(9)

55 g. of 2-hydroxy-3-chloro-7-methyl-pyrazolo(1,5-α) pyrimidine are dissolved in 300 ml. of acetonitrile and stirred for 3 hours at 50 to 60° C. with 45 g. of potassium carbonate and 57 g. of O,O-diethylthionophosphoric acid ester chloride. The mixture is then poured into water, taken up with benzene, washed, dried and "slightly distilled."

The yield is 47 g. (47% of theory), m.p. 54° C. For $C_{11}H_{15}O_3N_3ClSP$ (molecular weight 336)—Calculated: N, 12.5; Cl, 10.6; S, 9.5; P, 9.2%. Found N, 11.9; Cl, 10.5; S, 10.0; P, 9.7%.

EXAMPLES 10–12

In manner analogous to that of Example 9, the following compounds can be prepared:

| Compound | | Melting point (° C.) |
|---|---|---|
| (10) | (CH₃O)₂P(S)—O—[4-Cl-pyrazolo(1,5-a)-7-methylpyrimidine] | 58–60 |
| (11) | C₂H₅O(C₂H₅)P(S)—O—[4-Cl-pyrazolo(1,5-a)-7-methylpyrimidine] | 59–61 |
| (12) | (C₂H₅O)₂P(O)—O—[4-Cl-pyrazolo(1,5-a)-7-methylpyrimidine] | 74–77 |

The starting material required for Examples 9–12 is obtainable as follows:

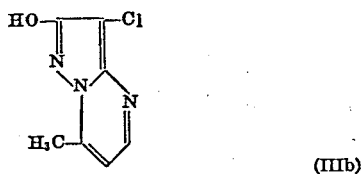

(IIIb)

75 g. of 2-hydroxy-7-methyl-pyrazolo(1,5-α)pyrimidine are dissolved in 1600 ml. of glacial acetic acid, and 38 g. of chlorine are introduced into the solution at 70° C. After stirring for 30 minutes at room temperature, 40 g. of sodium hydroxide, dissolved in 100 ml. of water, are added. The mixture is then heated to 90° C., cooled, the precipitate is filtered off with suction, washed with ether, and dried on clay.

Yield: 62 g. (67% of the theory).

EXAMPLE 13

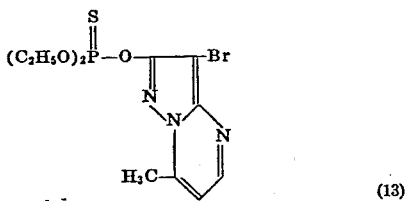

(13)

46 g. of 2-hydroxy-3-bromo-7-methyl-pyrazolo(1,5-α)pyrimidine, suspended or dissolved in 200 ml. of acetonitrile, are stirred overnight with 22 g. of triethylamine and 33 g. of O,O-di-ethylthionophosphoric acid ester chloride. The mixture is then poured into water, taken up with benzene, washed, dried and "slightly distilled."

The product melts at 72 to 74° C. The yield is 42 g. (55% of theory).

Calculated for C₁₁H₁₅O₃N₃BrSP (molecular weight 380): N, 11.1; S, 8.4; P, 8.2%. Found: N, 11.0; S, 8.3; P, 8.3%.

EXAMPLES 14–18

In manner analogous to that of Example 13, the following compounds can be prepared:

| Compound | | Melting point (° C.) |
|---|---|---|
| (14) | (C₂H₅O)₂P(O)—O—[4-Br-pyrazolo(1,5-a)-7-methylpyrimidine] | 100–103 |
| (15) | C₂H₅O(C₂H₅)P(S)—O—[4-Br-pyrazolo(1,5-a)-7-methylpyrimidine] | 82 |
| (16) | sec.-C₄H₉O(CH₃)P(S)—O—[4-Br-pyrazolo(1,5-a)-7-methylpyrimidine] | 115–118 |
| (17) | iC₃H₇O(CH₃)P(S)—O—[4-Br-pyrazolo(1,5-a)-7-methylpyrimidine] | 135 |
| (18) | (CH₃O)₂P(S)—O—[4-Br-pyrazolo(1,5-a)-7-methylpyrimidine] | 92 |

The starting material for Examples 13–18 can be obtained as follows:

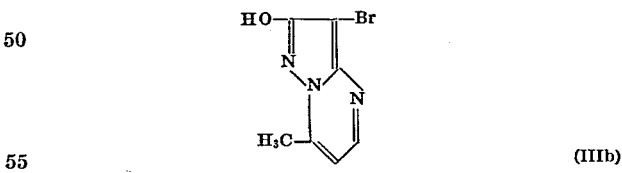

(IIIb)

48 g. of bromine are added to 45 g. of 2-hydroxy-7-methyl-pyrazolo(1,5-α)pyrimidine in 1200 ml. of glacial acetic acid. After stirring for 20 minutes at room temperature, 24 g. of sodium hydroxide, dissolved in 60 ml. of water, are added. The mixture is then heated to 100° C., cooled, the precipitate is filtered off with suction, washed with ether, and dried on clay.

The yield is 40 g. (59% of theory), the melting point 186° C. (with decomposition).

Calculated for C₇H₆ON₃Br (molecular weight 228): N, 18.4; Br, 35.1%. Found: N, 18.7; Br, 35.2%.

The invention will be further illustrated in the following comparative examples and tables.

EXAMPLE 19

Pluetta test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Pluetta maculipennis*).

After the specified periods of time, the degree of destruction is determined as a percentage: 100% means that all the caterpillars are killed whereas 0% that none of the caterpillars are killed.

The active compounds, the concentrations of the active compounds, the evaluation times and the results can be seen from Table 1.

TABLE 1.—(PLUTELLA TEST)

| Active compounds | | Concentration of active compound in percent | Degree of destruction in percent after 3 days |
|---|---|---|---|
| (A) | 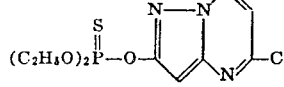 (known) | 0.1<br>0.01<br>0.001 | 100<br>100<br>20 |
| (B) | 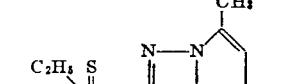 (known) | 0.1<br>0.01<br>0.001 | 100<br>100<br>0 |
| (4) |  | 0.1<br>0.01<br>0.001 | 100<br>100<br>90 |
| (18) | 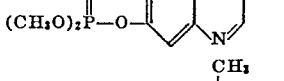 | 0.1<br>0.01<br>0.001 | 100<br>100<br>85 |
| (3) | 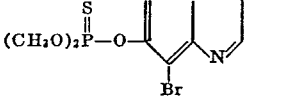 | 0.1<br>0.01<br>0.001 | 100<br>100<br>100 |
| (9) | 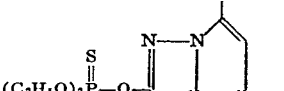 | 0.1<br>0.01<br>0.001 | 100<br>100<br>100 |
| (13) | 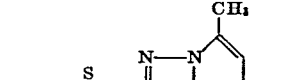 | 0.1<br>0.01<br>0.001 | 100<br>100<br>95 |
| (2) | 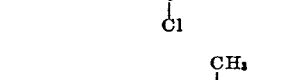 | 0.1<br>0.01<br>0.001 | 100<br>100<br>100 |
| (12) | 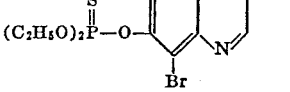 | 0.1<br>0.01<br>0.001 | 100<br>100<br>90 |

TABLE 1—Continued
| Active compounds | | Concentration of active compound in percent | Degree of destruction in percent after 3 days |
|---|---|---|---|
| (14) | 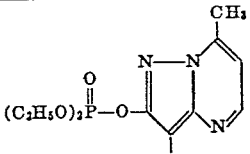 | 0.1<br>0.01<br>0.001 | 100<br>100<br>90 |
| (1) | 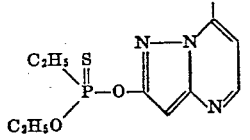 | 0.1<br>0.01<br>0.001 | 100<br>100<br>100 |
| (11) | 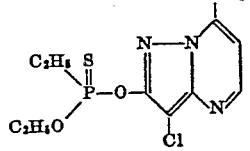 | 0.1<br>0.01<br>0.001 | 100<br>100<br>100 |
| (15) | 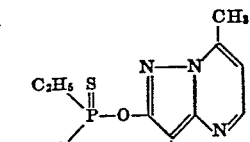 | 0.1<br>0.01<br>0.001 | 100<br>100<br>100 |
| (5) | 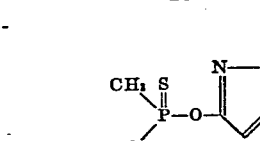 | 0.1<br>0.01<br>0.001 | 100<br>100<br>100 |
| (17) | 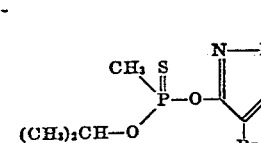 | 0.1<br>0.01<br>0.001 | 100<br>100<br>100 |
| (8) | 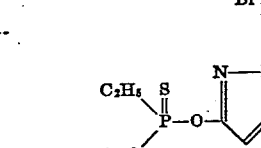 | 0.1<br>0.01<br>0.001 | 100<br>100<br>100 |
| (6) | 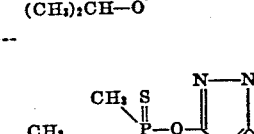 | 0.1<br>0.01<br>0.001 | 100<br>100<br>100 |
| (16) | 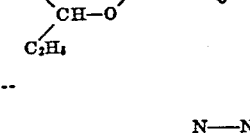 | 0.1<br>0.01<br>0.001 | 100<br>100<br>100 |
| (7) | 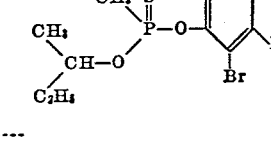 | 0.1<br>0.01<br>0.001 | 100<br>100<br>70 |

EXAMPLE 20

*Myzus test* (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2.

TABLE 2.—(MYZUS TEST)

| Active compounds | Concentration of active compound in percent | Degree of destruction in percent after 1 day |
|---|---|---|
| (C) 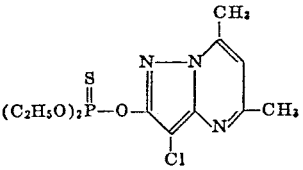 (known) | 0.1<br>0.01<br>0.001 | 98<br>40<br>0 |
| (D) 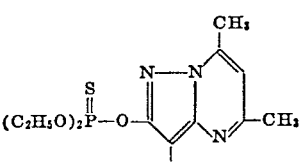 (known) | 0.1<br>0.01<br>0.001 | 80<br>20<br>0 |
| (E) 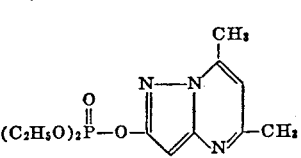 (known) | 0.1<br>0.01<br>0.001 | 100<br>90<br>0 |
| (F) 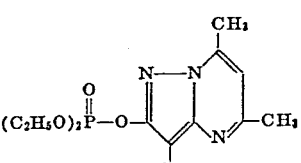 (known) | 0.1<br>0.01<br>0.001 | 100<br>90<br>0 |
| (4) 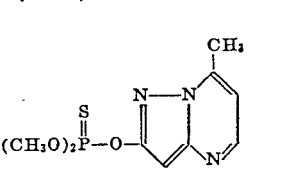 | 0.1<br>0.01<br>0.001 | 100<br>100<br>99 |
| (18) 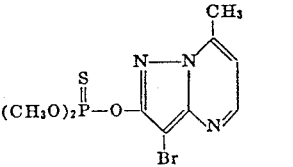 | 0.1<br>0.01<br>0.001 | 100<br>100<br>100 |
| (3) 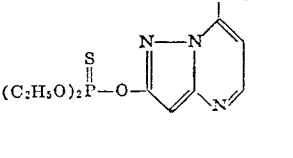 | 0.1<br>0.01<br>0.001 | 100<br>100<br>90 |

TABLE 2—Continued
| Active compounds | Concentration of active compound in percent | Degree of destruction in percent after 1 day |
|---|---|---|
| (9) 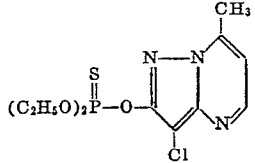 | 0.1<br>0.01<br>0.001 | 100<br>100<br>99 |
| (2) 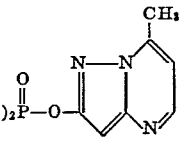 | 0.1<br>0.01<br>0.001 | 100<br>100<br>100 |
| (12) 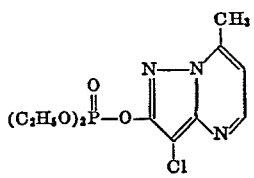 | 0.1<br>0.01<br>0.001 | 100<br>100<br>90 |
| (14) 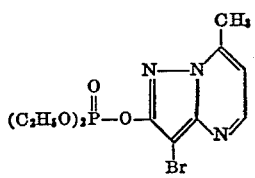 | 0.1<br>0.01<br>0.001 | 100<br>100<br>60 |
| (1) 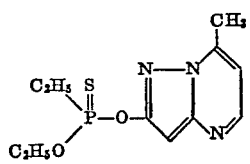 | 0.1<br>0.01<br>0.001 | 100<br>100<br>100 |
| (11) 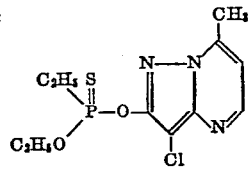 | 0.1<br>0.01<br>0.001 | 100<br>100<br>99 |
| (15) 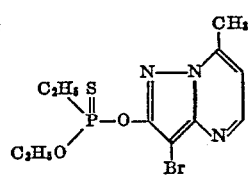 | 0.1<br>0.01<br>0.001 | 100<br>100<br>100 |
| (5) 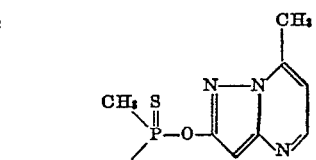 | 0.1<br>0.01<br>0.001 | 100<br>100<br>100 |
| (17) 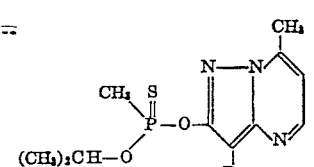 | 0.1<br>0.01<br>0.001 | 100<br>99<br>90 |

TABLE 2—Continued

| Active compounds | Concentration of active compounds in percent | Degree of destruction in percent after 1 day |
|---|---|---|
| (8) 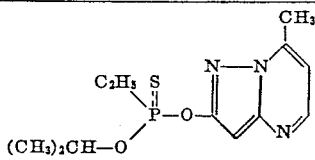 | 0.1<br>0.01<br>0.001 | 100<br>100<br>98 |
| (6) 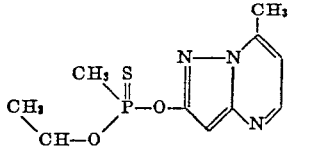 | 0.1<br>0.01<br>0.001 | 100<br>99<br>80 |
| (7) 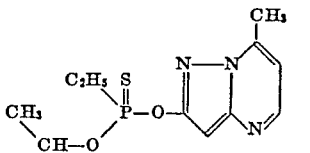 | 0.1<br>0.01<br>0.001 | 100<br>100<br>98 |

EXAMPLE 21

Tetranychus test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3.—(TETRANYCHUS TEST)

| Active compounds | Concentration of active compound in percent | Degree of destruction in percent after 2 days |
|---|---|---|
| (A) 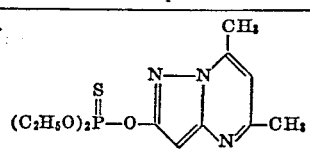<br>(known) | 0.1 | 0 |
| (C) 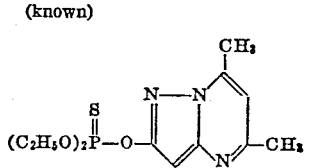<br>(known) | 0.1 | 0 |
| (D) 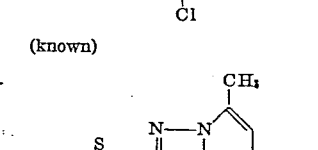<br>(known) | 0.1 | 0 |

TABLE 3—Continued
| Active compounds | | Concentration of active compound in percent | Degree of destruction in percent after 2 days |
|---|---|---|---|
| (F) | 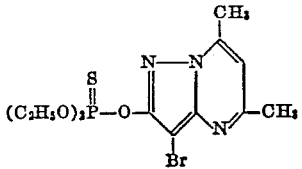 (known) | 0.1 | 0 |
| (B) | 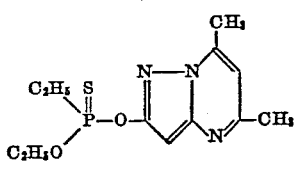 (known) | 0.1 | 0 |
| (G) | 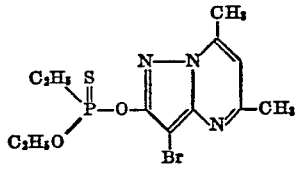 (known) | 0.1 | 0 |
| (10) | 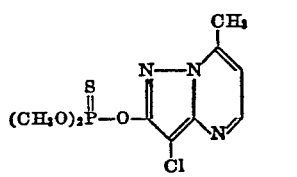 | 0.1<br>0.01 | 100<br>100 |
| (3) | 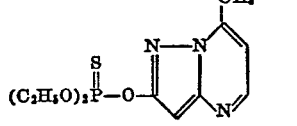 | 0.1<br>0.01 | 100<br>70 |
| (9) | 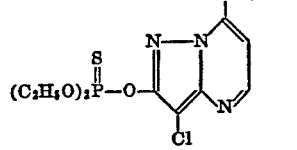 | 0.1<br>0.01 | 100<br>98 |
| (13) | 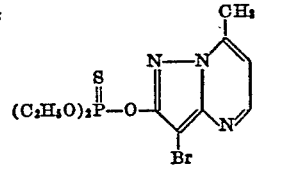 | 0.1<br>0.01 | 100<br>98 |
| (3) | 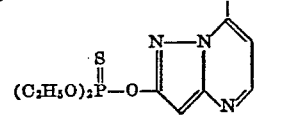 | 0.1<br>0.01 | 100<br>90 |
| (12) | 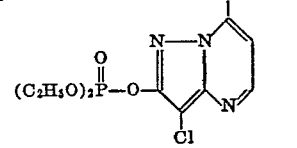 | 0.1<br>0.01 | 98<br>65 |

TABLE 3—Continued

| Active compounds | Concentration of active compound in percent | Degree of destruction in percent after 2 days |
|---|---|---|
| (14) [(C₂H₅O)₂P(O)−O− pyrazolo[1,5-a]pyrimidine with CH₃ and Br substituents] | 0.1 / 0.01 | 100 / 90 |
| (1) [C₂H₅(S)(C₂H₅O)P−O− pyrazolopyrimidine with CH₃] | 0.1 / 0.01 | 100 / 70 |
| (11) [C₂H₅(S)(C₂H₅O)P−O− pyrazolopyrimidine with CH₃ and Cl] | 0.1 / 0.01 | 100 / 100 |
| (15) [C₂H₅(S)(C₂H₅O)P−O− pyrazolopyrimidine with CH₃ and Br] | 0.1 / 0.01 | 100 / 80 |
| (5) [CH₃(S)((CH₃)₂CH−O)P−O− pyrazolopyrimidine with CH₃] | 0.1 / 0.01 | 100 / 98 |
| (6) [CH₃(S)(CH₃CH(C₂H₅)−O)P−O− pyrazolopyrimidine with CH₃] | 0.1 / 0.01 | 100 / 70 |

EXAMPLE 22

LD$_{100}$ test

Test insects: *Sitophilus granarius*
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 4.

TABLE 4.—(LD₁₀₀ test)

| Active compound | Concentration of active compound in percent | Destruction in percent |
|---|---|---|
| (E) 7-methyl-5-methyl-pyrazolo[1,5-a]pyrimidin-2-yl O,O-diethyl phosphate (known) | 0.2<br>0.02 | 100<br>0 |
| (F) 7-methyl-5-methyl-3-bromo-pyrazolo[1,5-a]pyrimidin-2-yl O,O-diethyl phosphate (known) | 0.2 | 0 |
| (D) 7-methyl-5-methyl-3-bromo-pyrazolo[1,5-a]pyrimidin-2-yl O,O-diethyl phosphorothioate (known) | 0.2 | 0 |
| (C) 7-methyl-5-methyl-3-chloro-pyrazolo[1,5-a]pyrimidin-2-yl O,O-diethyl phosphorothioate (known) | 0.2 | 80 |
| (10) 7-methyl-3-chloro-pyrazolo[1,5-a]pyrimidin-2-yl O,O-dimethyl phosphorothioate | 0.2<br>0.02<br>0.002 | 100<br>100<br>50 |
| (18) 7-methyl-3-bromo-pyrazolo[1,5-a]pyrimidin-2-yl O,O-dimethyl phosphorothioate | 0.2<br>0.02 | 100<br>90 |
| (14) 7-methyl-3-bromo-pyrazolo[1,5-a]pyrimidin-2-yl O,O-diethyl phosphate | 0.2<br>0.02 | 100<br>100 |
| (4) 7-methyl-pyrazolo[1,5-a]pyrimidin-2-yl O,O-dimethyl phosphorothioate | 0.2<br>0.02<br>0.002 | 100<br>100<br>0 |
| (9) 7-methyl-3-chloro-pyrazolo[1,5-a]pyrimidin-2-yl O,O-diethyl phosphorothioate | 0.2<br>0.02<br>0.002 | 100<br>100<br>70 |

TABLE 4.—Continued

| Active compound | Concentration of active compound in percent | Destruction in percent |
|---|---|---|
| (12) 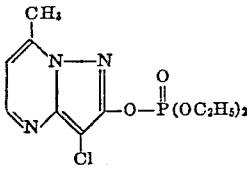 | 0.2<br>0.02<br>0.002 | 100<br>100<br>0 |

EXAMPLE 23

LT₁₀₀ test for Diptera

Test insects: *Aëdes aegypti*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The tests insects, the active compounds, the concentrations of the active compounds and the periods of time at which there is a 100% destruction can be seen from the following Table 5.

TABLE 5.—(LT₁₀₀ TEST FOR DIPTERA)

| Active compounds | Concentration of active compound in percent | LT₁₀₀ |
|---|---|---|
| (E) 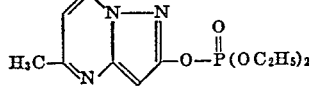 (known) | 0.2 | 120' |
| (F) 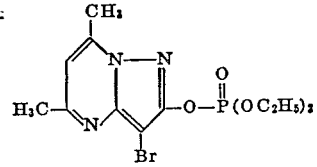 (known) | 0.2 | 3ʰ=90% |
| (D) 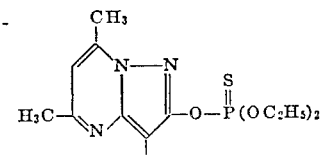 (known) | 0.2 | 3ʰ=0% |
| (C) 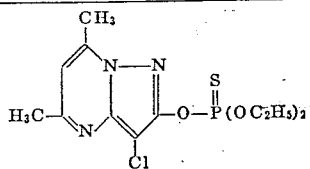 (known) | 0.2 | 3ʰ=0% |
| (10) 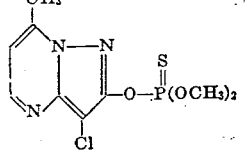 | 0.2<br>0.02 | 120'<br>180' |
| (9) 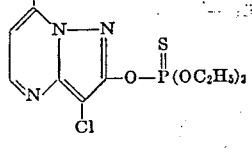 | 0.2<br>0.02 | 120'<br>180' |
| (2) 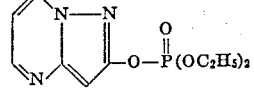 | 0.2<br>0.02 | 60'<br>180' |
| (3) 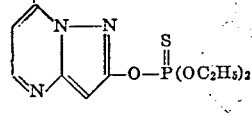 | 0.2<br>0.02 | 60'<br>180' |
| (5) 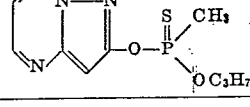 | 0.2<br>0.02 | 120'<br>180' |

EXAMPLE 24

Critical concentration test/soil insects

Test insect: Cabbage root fly maggots (*Phorbia brassicae*)
  Solvent: 3 parts by weight acetone
  Emulsifier: 1 part by weight alkylarylpolyglycol ether To produce a suitable preparation of active compound 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature.

After 24 hours, the test animals are put into the treated soil and, a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 6.

TABLE 6.—(SOIL INSECTICIDES/PHORBIA BRASSICAE MAGGOTS)

| Active compounds | Degree of destruction in percent with concentration of active compound in p.p.m. of— | | | |
|---|---|---|---|---|
| | 20 | 10 | 5 | 2.5 |
| (13) 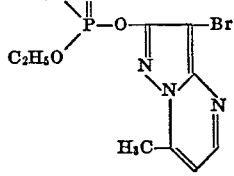 | 100 | 100 | 95 | 70 |
| (15) 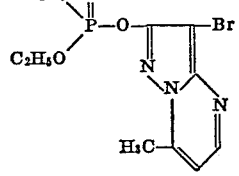 | 100 | 100 | 20 | |
| (17) 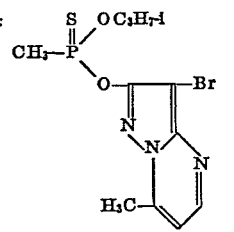 | 100 | 100 | 92 | 50 |
| (7) 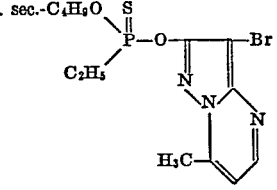 | 100 | 95 | 50 | |
| (8) 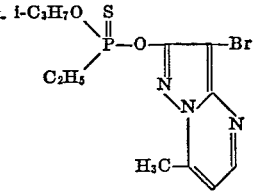 | 100 | 100 | 50 | |
| (12) 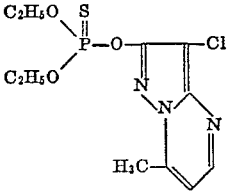 | 100 | 100 | 100 | 70 |

TABLE 6—Continued

| Active compounds | Degree of destruction in percent with concentration of active compound in p.p.m. of— | | | |
|---|---|---|---|---|
| | 20 | 10 | 5 | 2.5 |
| (11) [structure: C₂H₅, C₂H₅O-P(=S)-O-pyrazolopyrimidine with Cl and H₃C substituents] | 100 | 100 | 75 | |
| (F) [structure: CH₃, H₃C-pyrazolopyrimidine with Br, -O-P(=O)(OC₂H₅)₂] (known) | 0 | | | |
| (C) [structure: CH₃, H₃C-pyrazolopyrimidine with Cl, -O-P(=O)(OC₂H₅)₂] (known) | 0 | | | |

EXAMPLE 25

Critical concentration test

Test nematode: *Meloidogyne sp.*
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of destruction of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following Table 7.

TABLE 7.—(NEMATOCIDES/MELOIDOGYNE INCOGNITA)

| Active compounds | Degree of destruction in percent with a concentration of active compound in p.p.m. of— | | | |
|---|---|---|---|---|
| | 40 | 20 | 10 | 5 |
| (1) [structure: C₂H₅, C₂H₅O-P(=S)-O-pyrazolopyrimidine with H₃C substituent] | 100 | 99 | 95 | 50 |
| (3) [structure: C₂H₅O, C₂H₅O-P(=S)-O-pyrazolopyrimidine with H₃C substituent] | 100 | 100 | 95 | 75 |

TABLE 7—Continued

| Active compounds | Degree of destruction in percent with a concentration of active compound in p.p.m. of— | | | |
|---|---|---|---|---|
| | 40 | 20 | 10 | 5 |
| (9) 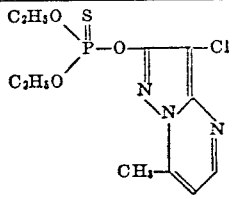 | 100 | 100 | 90 | |
| (C) 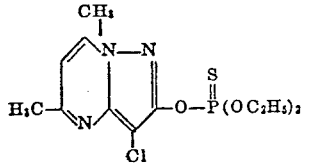 (known) | 0 | | | |

EXAMPLE 26

Tick test

Solvent: 35 parts by weight ethyleneglycolmonomethyl ether

Emulsifier: 35 parts by weight nonylphenolypolycol ether

To produce a suitable formulation, 3 parts by weight of the active compound are mixed with 7 parts by weight of the above-mentioned solvent-emulsifier mixture, and the emulsion concentrate so obtained is diluted with water to the concentration desired in each case.

Adult, gorged female ticks of the species *Boophilus microplus* (sensitive and resistant, respectively) are immersed for one minute in these preparation of active compound. After immersion of, in each case, 10 female specimens of the various tick species, they are transferred to Petri dishes, the bottom of which is covered with a correspondingly large filter disc.

After 10 days, the effectiveness of the preparation of active compound is determined by ascertaining the inhibition of egg deposition compared with untreated control ticks. The effect is expressed as a percentage, 100% meaning that eggs ceased to be deposited, and 0% signifying that the ticks deposited eggs in normal amount.

The active compounds investigated, the concentrations tried, the parasites tested and the findings obtained can be seen from the following Table 8.

TABLE 8.—(TICK TEST)

| Active compounds | Concentration of active compound in p.p.m. | Inhibition of egg deposition in percent—*Boophilus microplus* | |
|---|---|---|---|
| | | Ridge-land strain | Biarra strain |
| (2) 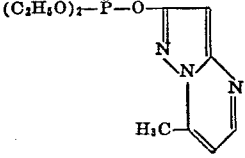 | 10,000<br>1,000<br>100 | | 100<br>100<br><50 |
| (3) 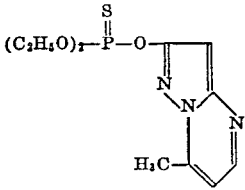 | 10,000<br>1,000<br>100 | | >50<br>>50<br>>50 |
| (4) 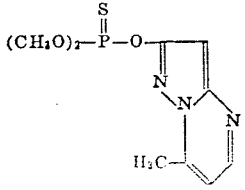 | 10,000<br>1,000<br>100 | 100<br>100<br>0 | <50<br>0<br>0 |

TABLE 8—Continued
| Active compounds | Concentration of active compound in p.p.m. | Inhibition of egg deposition in percent—*Boophilus microplus* | |
|---|---|---|---|
| | | Ridgeland strain | Biarra strain |
| (5) 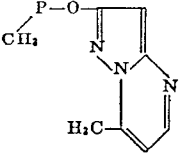 | 10,000<br>1,000<br>100 | 100<br>>50<br>>50 | 100<br>>50<br>0 |
| (6) 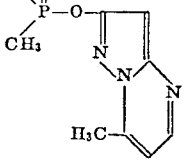 | 10,000<br>1,000<br>100 | 100<br>100<br>100 | 100<br>100<br><50 |
| (7) 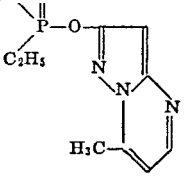 | 10,000<br>1,000<br>100 | >50<br>>50<br>>50 | >50<br>>50<br><50 |
| (8) 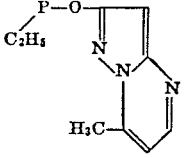 | 10,000<br>1,000<br>100 | >50<br>>50<br>>50 | 100<br>>50<br>>50 |
| (9) 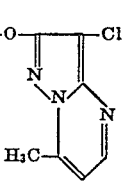 | 10,000<br>1,000<br>100 | 100<br>100<br>100 | >50<br>>50<br><50 |
| (10) 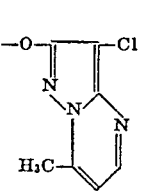 | 10,000<br>1,000 | 100<br>0 | 100<br>0 |
| (11) 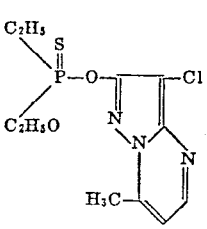 | 10,000<br>1,000<br>100 | 100<br>100<br>>50 | 100<br>100<br>0 |

TABLE 8—Continued

| Active compounds | Concentration of active compound in p.p.m. | Inhibition of egg deposition percent—*Boophilus microplus* Ridgeland strain | Biarra strain |
|---|---|---|---|
| (12) $(C_2H_5O)_2-\overset{O}{\underset{\|}{P}}-O-$[3-methyl-6-chloro-pyrazolo[1,5-a]pyrimidine] | 10,000<br>1,000 | 100<br>100 | 100<br>>50 |
| (13) $(C_2H_5O)_2-\overset{S}{\underset{\|}{P}}-O-$[3-methyl-6-bromo-pyrazolo[1,5-a]pyrimidine] | 10,000<br>1,000<br>100 | 100<br>100<br>>50 | >50<br><50<br>0 |
| (14) $(C_2H_5O)-\overset{O}{\underset{\|}{P}}-O-$[3-methyl-6-bromo-pyrazolo[1,5-a]pyrimidine] | 10,000<br>1,000 | 100<br>>50 | >50<br><50 |
| (15) $\underset{C_2H_5O}{\overset{C_2H_5}{\diagdown}}\overset{S}{\underset{\|}{P}}-O-$[3-methyl-6-bromo-pyrazolo[1,5-a]pyrimidine] | 10,000<br>1,000 | 100<br>100 | 100<br>>50 |
| (16) $\underset{H_3C}{\overset{sec\text{-}C_4H_9O}{\diagdown}}\overset{S}{\underset{\|}{P}}-O-$[3-methyl-6-bromo-pyrazolo[1,5-a]pyrimidine] | 10,000<br>1,000<br>100 | 100<br>100<br><50 | >50<br>0<br>0 |
| (17) $\underset{CH_3}{\overset{iC_3H_7O}{\diagdown}}\overset{S}{\underset{\|}{P}}-O-$[3-methyl-6-bromo-pyrazolo[1,5-a]pyrimidine] | 10,000<br>1,000<br>100 | 100<br>100<br>100 | >50<br>>50<br>0 |
| (18) $(CH_3O)_2-\overset{S}{\underset{\|}{P}}-O-$[3-methyl-6-bromo-pyrazolo[1,5-a]pyrimidine] | 10,000<br>1,000<br>100 | <50<br><50<br>0 | <50<br>0<br>0 |

EXAMPLE 27

Test with parasitizing fly larvae

Solvent: 35 parts by weight ethyleneglycolmonomethyl ether
Emulsifier: 35 parts by weight nonylphenolpolyglycol ether To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (*Lucilia cuprina*) are put into a test-tube which contains about 1 cc. of horse musculature. 0.5 ml. of the preparation of active compound are applied to this horseflesh. After 24 hours, the degree of destruction is determined as a percentage. 100% means that all, 0% that no, larvae have been killed.

The active compound tested, the concentration applied and the test results obtained can be seen from Table 9.

TABLE 9
(*Lucilia cuprina*)

| Active compounds | Concentration of active compound in p.p.m. | Degree of destruction in percent |
|---|---|---|
| (2) $(C_2H_5O)_2-\overset{\overset{O}{\|}}{P}-O-\underset{\underset{H_3CO-}{}}{[\text{pyrazolopyrimidine}]}$ | 300<br>30<br>3 | 100<br>100<br>0 |
| (3) $(C_2H_5O)_2-\overset{\overset{S}{\|}}{P}-O-\underset{\underset{H_3C-}{}}{[\text{pyrazolopyrimidine}]}$ | 300<br>30<br>3 | 100<br>100<br><50 |
| (4) $(CH_3O)_2-\overset{\overset{S}{\|}}{P}-O-\underset{\underset{H_3C-}{}}{[\text{pyrazolopyrimidine}]}$ | 300<br>30 | 100<br><50 |
| (5) $\underset{CH_3}{\overset{iC_3H_7O}{\diagdown}}\overset{\overset{S}{\|}}{P}-O-\underset{\underset{H_3C-}{}}{[\text{pyrazolopyrimidine}]}$ | 300<br>30 | 100<br><50 |
| (6) $\underset{CH_3}{\overset{sec.-C_4H_9O}{\diagdown}}\overset{\overset{S}{\|}}{P}-O-\underset{\underset{H_3C-}{}}{[\text{pyrazolopyrimidine}]}$ | 300<br>30<br>3 | 100<br>100<br><50 |
| (7) $\underset{C_2H_5}{\overset{sec.-C_4H_9O}{\diagdown}}\overset{\overset{S}{\|}}{P}-O-\underset{\underset{H_3C-}{}}{[\text{pyrazolopyrimidine}]}$ | 300<br>30<br>3 | <50<br><50<br><50 |
| (8) $\underset{C_2H_5}{\overset{iC_3H_7O}{\diagdown}}\overset{\overset{S}{\|}}{P}-O-\underset{\underset{H_3C-}{}}{[\text{pyrazolopyrimidine}]}$ | 300<br>30<br>3 | 100<br><50<br><50 |
| (9) $(C_2H_5O)_2-\overset{\overset{S}{\|}}{P}-O-\underset{\underset{H_3C-}{}}{[\text{pyrazolopyrimidine}]}-Cl$ | 300<br>30<br>3 | 100<br>100<br><50 |

TABLE 9—Continued
| Active compounds | Concentration of active compound in p.p.m. | Degree of destruction in percent |
|---|---|---|
| (10) 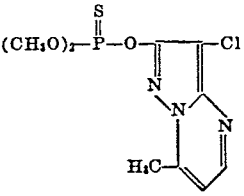 | 300<br>30 | 100<br>100 |
| (11) 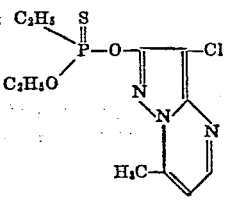 | 300<br>30<br>3 | 100<br>100<br><50 |
| (12) 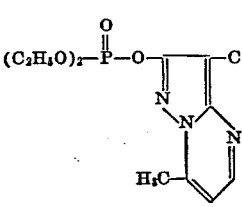 | 300<br>30<br>3 | 100<br>100<br><50 |
| (13) 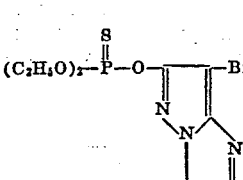 | 300<br>30<br>3 | 100<br>100<br><50 |
| (14) 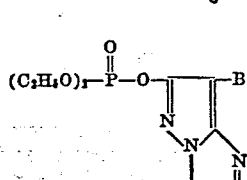 | 300<br>30<br>3 | 100<br>100<br>0 |
| (15) 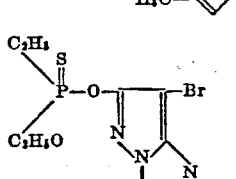 | 300<br>30<br>3 | 100<br>100<br><50 |
| (16) 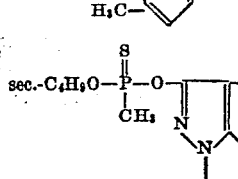 | 300<br>30<br>3 | 100<br><50<br>0 |
| (17) 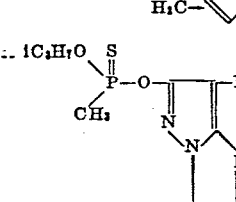 | 300<br>30<br>3 | 100<br>100<br><50 |

TABLE 9—Continued

| Active compounds | Concentration of active compound in p.p.m. | Degree of destruction in percent |
|---|---|---|
| (18) 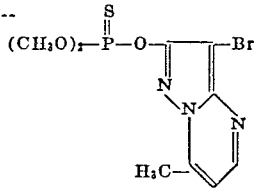 | 300<br>30<br>3 | 100<br>100<br><50 |

It will be appreciated that the instant specification and examples are set forth by way of illustration and not limitation, and that various modifications and changes may be made without departing from the spirit and scope of the present invention.

What is claimed is:

1. A method of combating a pest selected from the group consisting of insect, acarid, and nematode pests which comprises applying to the pests or a habitat thereof an insecticidally, acaricidally, or nematocidally effective amount of an O-pyrazolopyrimidine-(thiono)-phosphoric (phosphonic) acid ester of the formula:

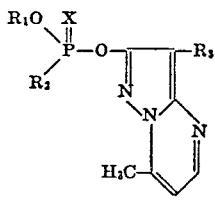

in which
  $R_1$ is alkyl with 1 to 6 carbon atoms,
  $R_2$ is alkyl with 1 to 4 carbon atoms or alkoxy with 1 to 6 carbon atoms,
  $R_3$ is hydrogen, chlorine or bromine, and
  X is oxygen or sulfur.

2. The method according to claim 1 in which $R_1$ has 1–4 carbon atoms and $R_2$ is methyl, ethyl, n-propyl, isopropyl, methoxy, ethoxy, n-butoxy, sec.-butoxy or tert.-butoxy.

3. The method according to claim 1 wherein such compound is O,O-diethyl-thionophosphoric acid ester of 2-hydroxy-3-bromo-7-methyl-pyrazolo(1,5-α)pyrimidine of the formula

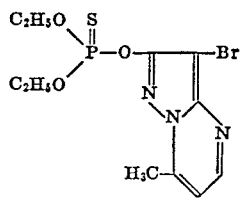

4. The method according to claim 1 wherein such compound is O,O-diethylphosphoric acid ester of 2-hydroxy-3 - bromo - 7 - methyl-pyrazolo(1,5-α)pyrimidine of the formula

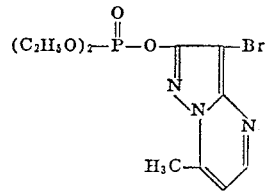

5. The method according to claim 1 wherein such compound is O,O-diethylthionophosphoric acid ester of 2-hydroxy-3-chloro-7-methyl-pyrazolo(1,5-α)pyrimidine of the formula

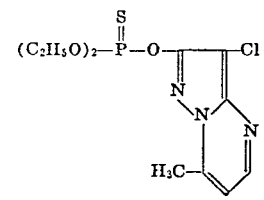

6. The method according to claim 1 wherein such compound is O,O-diethylphosphoric acid ester of 2-hydroxy-3-chloro-7 - methyl-pyrazolo(1,5-α)pyrimidine of the formula

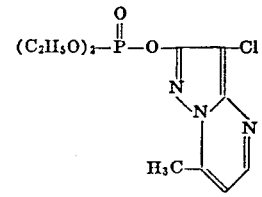

7. The method according to claim 1 wherein such compound is O,O-dimethyl-thionophosphoric acid ester of 2-hydroxy-3-bromo-7-methyl-pyrazolo(1,5-α)pyrimidine of the formula

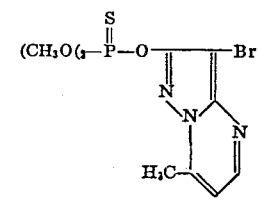

8. The method according to claim 1 wherein such compound is O,O-dimethyl-thionophosphoric acid ester of 2-hydroxy-7-methyl-pyrazolo(1,5-α)pyrimidine of the formula

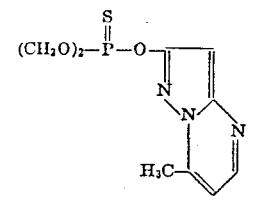

9. An insecticidal, acaricidal, or nematocidal composition comprising an insecticidally, acaricidally, or nematocidally effective amount of an O-pyrazolopyrimidine- (thiono)-phosphoric(phosphonic) acid ester of the formula

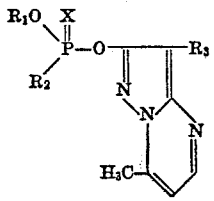

in which
R₁ is alkyl with 1 to 6 carbon atoms,
R₂ is alkyl with 1 to 4 carbon atoms or alkoxy with 1 to 6 carbon atoms,
R₃ is hydrogen, chlorine or bromine, and X is oxygen or sulfur
in admixture with a diluent.

10. The composition according to claim 9 wherein said compound is

O,O-diethyl-thionophosphoric acid ester of 2-hydroxy-3-bromo-7-methyl-pyrazolo(1,5-α)pyrimidine,
O,O-diethylthionophosphoric acid ester of 2-hydroxy-3-chloro-7-methyl-pyrazolo(1,5-α)pyrimidine,
O,O-diethyl-phosphoric acid ester of 2-hydroxy-3-chloro-7-methyl-pyrazolo(1,5-α)pyrimidine,
O,O-dimethyl-thionophosphoric acid ester of 2-hydroxy-3-bromo-7-methyl-pyrazolo(1,5-α)pyrimidine, or
O,O-dimethyl-thionophosphoric acid ester of 2-hydroxy-7-methyl-pyrazolo(1,5-α)pyrimidine.

References Cited
UNITED STATES PATENTS 3,402,176   9/1968   Schicke _____ 260—256.4 E
3,761,479   9/1973   Hoffman et al. ___ 260—256.5 R ALBERT T. MEYERS, Primary Examiner D. W. ROBINSON, Assistant Examiner

UNITED STATES PATENT OFFICE
CERTIFICATE OF CORRECTION

Patent No. 3,845,207  Dated October 29, 1974

Inventor(s) Hellmut Hoffmann et al.

It is certified that error appears in the above-identified patent and that said Letters Patent are hereby corrected as shown below:

Col. 4, cancel lines 33 and 34 and substitute

-- (Macrosiphum solanifolii), the current gall aphid (Crypotmyzus korschelti), the rosy apple aphid (Sappaphis --.

Col. 5, line 24, correct spelling of "(Acari)".

Col. 8, line 14 (Table 8), cancel "1,5354" and substitute

-- 1.5354 --.

Col. 30, line 2, after "and,", insert -- after --.

UNITED STATES PATENT OFFICE
CERTIFICATE OF CORRECTION

Patent No. 3,845,207      Dated October 29, 1974

Inventor(s) Hellmut Hoffmann et al.      Page - 2

It is certified that error appears in the above-identified patent and that said Letters Patent are hereby corrected as shown below:

Col. 44, claim 7, in the structural formula, cancel "$(CH_3O(_2)$" and substitute -- $(CH_3O)_2$ --.

Col. 44, claim 8, in the structural formula, cancel "$(CH_2O)_2$" and substitute -- $(CH_3O)_2$ --.

Signed and Sealed this twenty-second Day of July 1975

[SEAL]

Attest:

RUTH C. MASON  
Attesting Officer

C. MARSHALL DANN  
Commissioner of Patents and Trademarks